Figure 1:
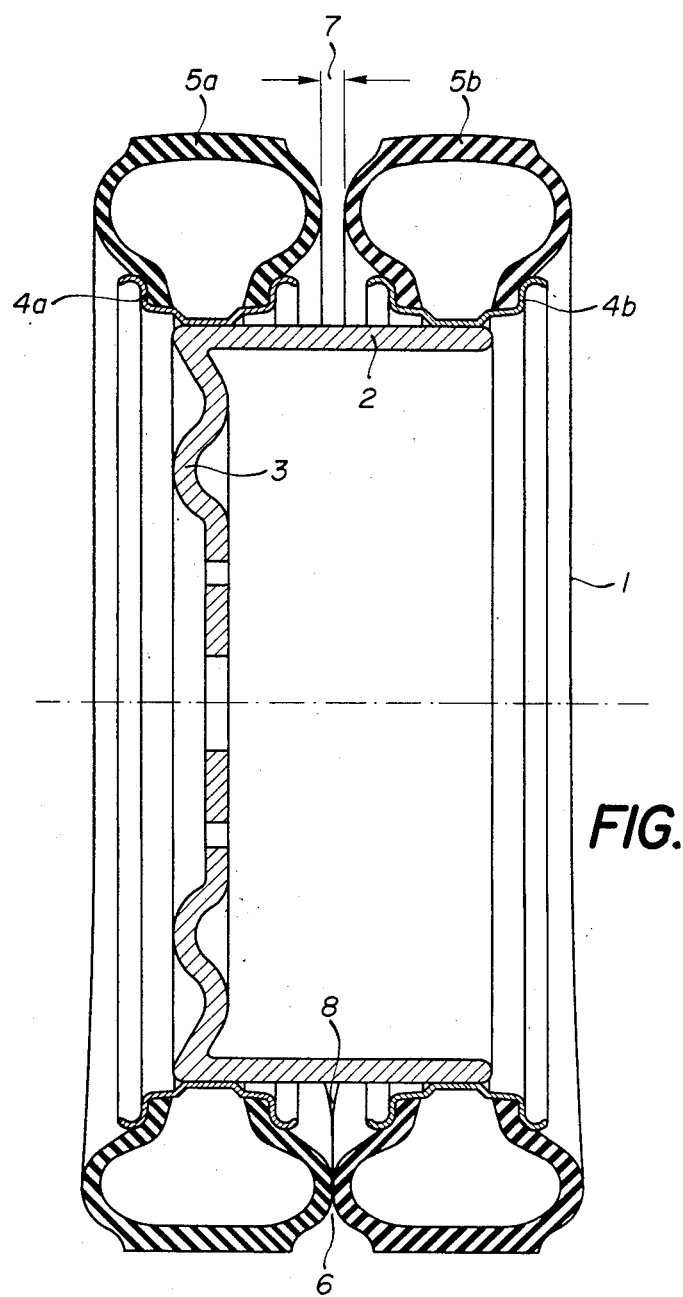

United States Patent [19]

Juhan

[11] Patent Number: 4,782,876

[45] Date of Patent: Nov. 8, 1988

[54] VEHICLE WHEEL

[75] Inventor: Jaroslaw V. M. Juhan, Geneve, Switzerland

[73] Assignee: JJD S.A., Geneva, Switzerland

[21] Appl. No.: 906,614

[22] Filed: Sep. 10, 1986

Related U.S. Application Data

[63] Continuation of Ser. No. 618,343, Jun. 7, 1984, abandoned.

[30] Foreign Application Priority Data

Jun. 13, 1983 [CH] Switzerland .................... 3239/83
Nov. 24, 1983 [CH] Switzerland .................... 6298/83

[51] Int. Cl.⁴ .................................................. B60B 11/04
[52] U.S. Cl. .................................. 152/340.1; 152/376; 301/13 R
[58] Field of Search ............. 152/340.1, 343.1, 344.1, 152/376; 301/36 R, 36 WP, 38 R, 40 S, 13 R, 13 SM

[56] References Cited

U.S. PATENT DOCUMENTS

| | | | |
|---|---|---|---|
| 1,914,266 | 6/1933 | Leupold | 301/36 WP |
| 2,032,261 | 2/1936 | Chiasson | 152/340.1 |
| 2,064,694 | 12/1936 | Simonds | 152/340.1 |
| 2,098,859 | 11/1937 | Chiasson | 152/344.1 |
| 3,915,503 | 10/1975 | Horton | 301/39 |
| 4,124,051 | 11/1978 | Horton | 301/39 |

FOREIGN PATENT DOCUMENTS

| | | | |
|---|---|---|---|
| 0384234 | 7/1908 | France | 152/376 |
| 178464 | 7/1922 | United Kingdom | 301/13 R |
| 8302921 | 7/1983 | World Int. Prop. O. | 301/13 R |

Primary Examiner—Michael Ball
Assistant Examiner—Ramon R. Hoch
Attorney, Agent, or Firm—Cushman, Darby & Cushman

[57] ABSTRACT

A vehicle wheel has at least two pneumatic tires mounted side by side on a single rim. When the weight of the vehicle is applied to the wheels, the pneumatic tires are slightly deformed in the lower portion of their circumference, their facing side walls coming to bear one against the other. In the upper portion of their circumference, the pneumatic tires remain separated from one another. This provides the best possible cooperation of the pneumatic tires, completely avoiding the overheating thereof and improving the road-holding of the vehicle and the adhesion of the wheels on a slippery road surface.

11 Claims, 3 Drawing Sheets

VEHICLE WHEEL

This is a continuation of application Ser. No. 618,343, filed June 7, 1984, now abandoned.

The present invention relates to a vehicle wheel, comprising at least two pneumatic tires mounted side by side. One embodiment of the invention is more particularly concerned with wheels of the aforementioned type, having a single rim, which is intended for being used as the front and/or the rear wheels of a high-speed automobile road vehicle, particularly a vehicle capable of reaching a speed of at least 120 km/h on the flat. Another embodiment of the invention is also intended for use on heavy vehicles.

The use of several pneumatic tires mounted in parallel on the same rim of a vehicle wheel, whether a driving vehicle or a towed vehicle, or even a bicycle wheel, was proposed a long time ago. For example, wheels equipped with several pneumatic tires have been described in French Patent No. 395,286, published on the 18th Feb. 1909, and in French Patent No. 433,525, published on the 9th Jan. 1912.

Among the advantages to be achieved by the use of a plurality of pneumatic tires mounted on the same rim, as compared with those of a single tire per rim, these patents mention a decrease in the fatigue due to wear of the tires, accompanied by an increase in the permissible loading, and also a reduction of the risk of an accident, in the event of a puncture in or a bursting of the tire.

However, in practice, the use of wheels having multiple tires for automobiles has never been developed on high-speed automobiles. In the field of pneumatic tires for high-speed automobiles, the tendency at the present time is to use large-section tires which have a large surface of contact with the ground. Such pneumatic tires make it possible to obtain a remarkable road-holding capacity and also a very good adhesion on a dry road. On the other hand, they have a tendency to increase the risk of sudden loss of adhesion on a wet road (a phenomenon known as "aquaplaning"), as compared with normal pneumatic tires having a narrower section. In addition, the cost thereof is appreciably higher than the cost of these normal or standard tires.

Furthermore, the pneumatic tires having a wide section produce the disadvantage of causing an appreciable decrease in the riding comfort, resulting from a poor absorption of the shocks produced by the irregularities in the road surface, particularly due to the fact that the sides of the wide-section pneumatic tires are not so high and are less deformable than those of the normal tires. On the other hand, the wide-section pneumatic tires, just like the ordinary pneumatic tires, have a tendency to become heated up to high temperatures at the high speeds which are reached by fast automobiles, as a result of which there is a danger of sudden destruction of the pneumatic tire and in any event a shortening of its useful life.

In the case of heavy transport vehicles, such as lorries, coaches and omnibuses, the use of twin wheels, each carrying a single pneumatic tire of large dimensions, mounted in pairs on each side of the rear axle, is general practice. However, the mounting of twin wheels on the front axle has remained reserved for vehicles of a quite particular type, such as cross-country vehicles of high tonnage serving for the transporting of ore in open-cast mines, the weight and the dimensions of such vehicles not permitting them to travel on a normal roadway.

A first object of the present invention is to provide a wheel with which it is possible to give an automobile road vehicle, particularly a fast automobile, a road-holding capacity which is at least as good, on a dry road, as that which results from the use of the best extra-wide section pneumatic tires which are available at the present time, while assuring a considerable decrease or even the complete elimination of the danger of aquaplaning on a wet road and, more generally, appreciably increasing the adhesion of the pneumatic tires on a slippery surface.

It is a further object of the invention to provide a wheel allowing to improve the road-holding capacity of an automobile vehicle, more particularly in situations in which strong lateral forces act on the vehicle, such as in cases of changing direction of motion at high speeds, by providing laterally co-operating tires on the wheel.

It is another object of the invention to reduce the wear on the pneumatic tires and also the danger of bursting of the pneumatic tires when a vehicle has travelled for a long time at high speed, owing to a reduction in the heat developing in the tire, while limiting the danger of accidents in the event of a punctured or burst tire and making it possible to obviate the necessity of changing a wheel on the spot in the event of a puncture.

Still another object of the invention is to reduce the cost of the pneumatic tire equipment for a high-speed automobile as compared to the case of the use of wide-section special tires.

Still another object of the invention is to provide a wheel comprising at least two tires mounted side by side on a single rim or on respective assembled rims, in which the friction between adjacent tires is reduced, while the advantages of co-operating adjacent tires are preserved.

The vehicle wheel according to the invention comprises at least two pneumatic tires mounted side by side, the spacing between the tires being such that, within the limits of normal inflation pressure of the pneumatic tires, the side walls of the tires which are facing one another are separated by a space or gap over their entire circumference when the wheel is not under load, whereas they bear one against the other, over a part of their circumference, when the wheel is subjected to the forces resulting from the application of the weight of the vehicle to the wheels, at rest and in motion.

According to a particular embodiment of the invention, the wheel comprises a flat annular separating member arranged co-axially between the tire side walls facing each other.

The part of the circumference over which the tire side walls bear against one another extends preferably at most over an arc of the circumference of the wheel corresponding to an angle of 90°.

While the number of tires of a wheel according to the invention is usually two, it may for certain applications be three, four or more.

Figure 2:
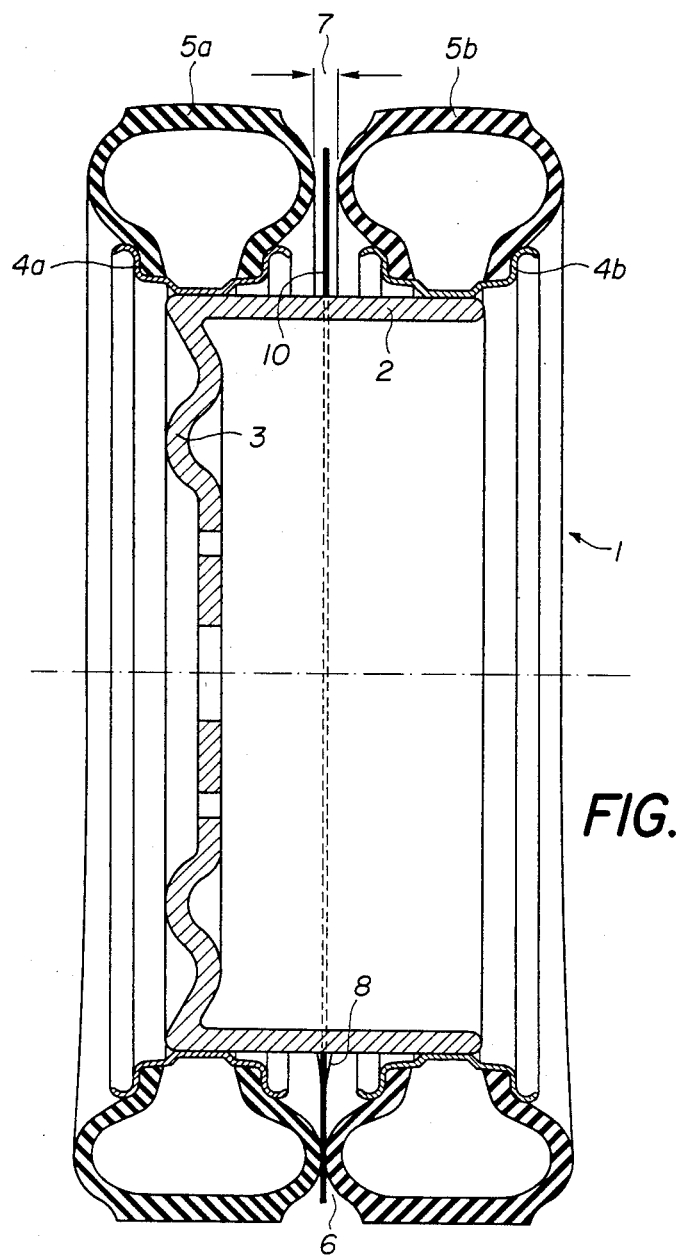
Figure 3:
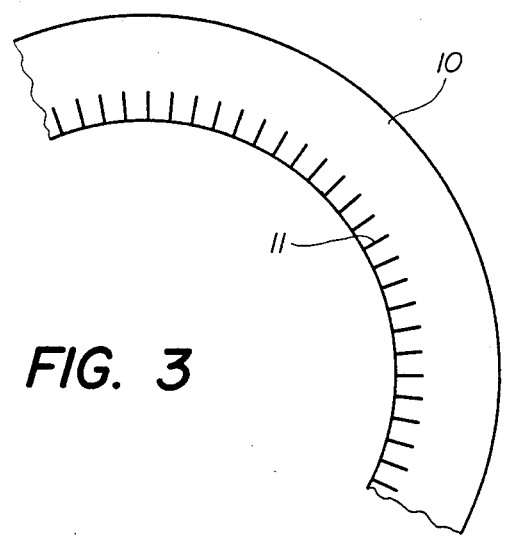
Figure 4:
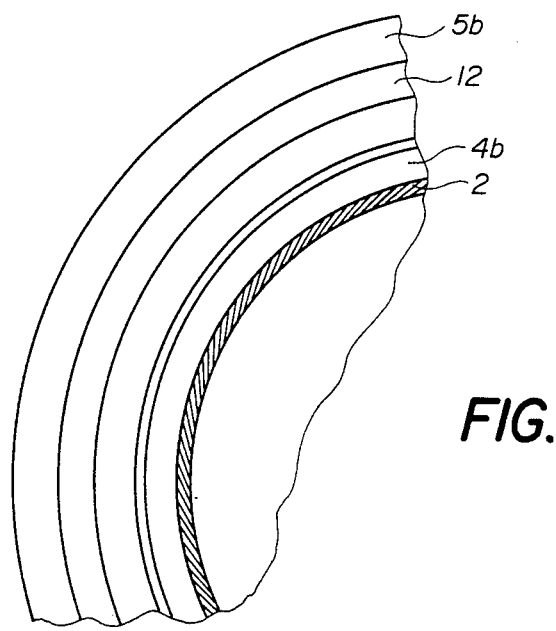

Various features of the invention will be more readily apparent from the following detailed description of embodiments of the wheel according to the invention, given by way of example and by reference to the attached drawings, in which:

FIG. 1 is a diametral sectional view of one embodiment of the wheel according to the invention, FIG. 2 is a diametral sectional view of another embodiment of the invention, FIG. 3 is a partial side view of a separating member as used in the wheel of FIG. 2, and FIG. 4 is a partial sectional side view along the median plane of a wheel as shown in FIG. 1, wherein a separating member is incorporated in a tire.

In FIG. 1 of the drawing, a wheel 1 is represented in the configuration which it assumes when it is mounted on a motor vehicle (not shown), the weight of which is resting entirely on the wheels, the pneumatic tires being inflated within their limits of normal inflation pressure.

In the embodiment as illustrated, the rim of the wheel 1 is formed by a support member 2, integral with the hub 3 of the wheel, and two fitting members 4a and 4b, assembled on the support member 2. These fitting members 4a and 4b each carry a respective pneumatic tire 5a and 5b.

The pneumatic tires 5a and 5b are slightly deformed, by compression, in the lower part of their circumference, on which are exerted the forces resulting from the application of the weight of the vehicle to the wheels, so that their width in this part of the circumference is slightly larger than their width in the upper part.

Therefore, those walls of the pneumatic tires 5a and 5b which are facing one another are bearing one against the other, as indicated by the reference numeral 6, in the lower part of their circumference, while they are separated by a gap, represented by the double arrow 7, in their upper part. The limit or boundary between the part where the walls of the pneumatic tires 5a and 5b are in mutual contact and that where they are separated is indicated by the reference numeral 8, it being understood that the exact positioning of this limit may vary according to the characteristics and the inflation pressure of the pneumatic tires, and the total weight of the vehicle (consequently its load) and the instantaneous dynamic conditions (especially the accelerations).

In all cases, the mutual bearing of the pneumatic tire walls occurs in the part close to the surface of contact of the tires with the road surface, in which they are subject to the forces resulting from the application of the weight of the vehicle and those resulting from the accelerations when the vehicle is moving. As a result, the pneumatic tires co-operate in this part of the circumference, and the arrangement provides simultaneously an optimal damping of the shocks resulting from irregularities in the road surface and a considerable improvement in the road-holding power and in the adhesion on a slippery surface. The lateral bearing of the side walls of the tires one against the other and in the vicinity of the surface of contact between the tires and the road is of particular importance for the road-holding power of the vehicle when strong lateral forces apply to the same, such as in the case of sharp turns taken at speed. On the other hand, the separating of the tires over the greater part of their circumference allows to avoid any tendency thereof to get overheated even at high speeds.

The fitting members 4a and 4b are advantageously assembled on the support member 2 so as to be detachable and to permit their relative spacing to be varied, in order to make possible an adjustment of this latter, for obtaining, in all cases, the best possible conditions as regards mutual contact between the walls of the pneumatic tires 5a and 5b in the zone close to their surface of contact with the road.

FIG. 2 shows a vehicle wheel similar to that of FIG. 1, except that an annular separating member 10 is inserted between the tires of the wheel. In this figure, the same reference numerals have been used as in FIG. 1 to designate the parts similar to those of FIG. 1.

The separating member 10 is shown in a partial side view in FIG. 3. It is made of a stiff but flexible material of a hardness greater than that of the tire side walls; for example, it may be made of a plastic material and have a thickness of about 1 or 2 millimeters, thus being very thin as compared to the width of the tires. As shown in FIG. 3, the inner portion of member 10 may be provided with radial cuttings 11 to allow the placing of the separating member between the tire fitting members 4a, 4b on support member 2. In this arrangement, the annular separating member 10 is freely mounted on the support member 2 in slightly frictional contact therewith. The presence of the separating member allows to substantially reduce any friction between the side walls of adjacent tires which may occur under heavy load in radial or axial direction of the wheel. It is also useful to reduce the friction between the tires in case of accidental loss of pressure in one of the adjacent tires of a wheel, thus increasing the safety of the vehicle. The annular separating member may be incorporated in a side wall or preferably both side walls of a tire, for example by vulcanization. In that case, the radial width of the member is preferably slightly greater than that of the contact zone between the side walls of adjacent tires.

FIG. 4 shows a partial sectional view along the radial middle place of the wheel of FIG. 1 with tire 56 comprising an incorporated annular separating member 12. Preferably both tires are provided with such separating members.

The use of an annular separating member is of particular interest for wheels of heavy vehicles where friction between the tires and resulting overheating thereof must be avoided. It allows a thus to use, for example, single rim twin tire wheels according to the invention on such heavy vehicles, and, accordingly, to obtain for the same the resulting advantages of road-holding power, cost reduction and increased safety.

I claim:

1. A vehicle wheel comprising: a rim structure for supporting at least two pneumatic tires in side-by-side relationship, each tire having two axially spaced apart bead portions, sidewalls and a peripheral road-engaging portion, said rim structure having an axis of rotation and including at least two side-by-side, fixed coaxial rigid rim means each of which engages the outside of both bead portions of a tire and supports the respective tire in a fixed position relative to said axis of rotation, said rim means providing a relative axial spacing between said tires such that, when said tires are inflated within the limits of normal inflation pressure, (a) adjacent tires are axially spaced from each other by a gap which exists between the mutually facing side walls of adjacent tires and which extends over the entire circumference of the tires when no load is applied to the wheel; and (b) when the weight of the vehicle is applied to the wheel, the mutually facing side walls of adjacent tires move into contact with each other and into lateral bearing relation in a zone close to the surface of contact of the tires with the road surface solely as a result of outward deformation of said mutually facing side walls due to the weight of the vehicle, said contact existing in said zone when the wheel is at rest and in motion, and said gap existing circumferentially outside said zone when the wheel is at rest and in motion.

2. A vehicle wheel comprising: a rim structure for supporting at least two pneumatic tires in side-by-side relationship, each tire having two axially spaced apart bear portions, sidewalls and a peripheral road-engaging portion, said rim structure having an axis of rotation and including at least two side-by-side fixed rigid rim means each of which engages the outside of both bead portions of a tire and supports the respective tire in a fixed position relative to said axis of rotation, and a thin, flat, annular separating member coaxial with said axis of rotation and located between two adjacent rim means, said separating member having a diameter such that it has opposite sides which face the mutually facing side walls of adjacent tires and said separating member being out of contact with the bead portions of adjacent tires, said rim means providing a relative axial spacing between said tires such that, when said tires are inflated within the limits of normal inflation pressure;

(a) adjacent tires are axially spaced from each other by a gap which exists between the mutually facing side walls of adjacent tires and which extends over the entire circumferences of the tires when no load is applied to the wheel; and (b) when the weight of the vehicle is applied to the wheel, the mutually facing side walls of adjacent tires move into contact with opposite sides of said separating member so that said mutually facing side walls bear laterally against each other through said separating member in a zone close to the surface of contact of the tires with the road surface solely as a result of outward deformation of said mutually facing side walls due to the weight of the vehicle, said contact existing in said zone when the wheel is at rest and in motion, said gap existing circumferentially outside said zone when the wheel is at rest and in motion.

3. A vehicle wheel as in claim 1 or claim 2 wherein said rim structure includes at least one cylindrical support and wherein at least one of rim means is assembled coaxially on said at least one cylindrical support.

4. A vehicle wheel as in claim 3 wherein said rim means is detachably assembled on said at least one cylindrical support to permit adjustment of the relative axial spacing between the tire supported by said one rim means and the tire supported an adjacent rim means.

5. A vehicle wheel as in claim 3 wherein at least two of said rim means are assembled coaxially on a single, common cylindrical support.

6. A vehicle wheel as in claim 4 wherein at least two of said rim means are assembled coaxially on a single, common cylindrical support.

7. A vehicle wheel as in claim 1 or 2 wherein the number of rim means and respective tires is two.

8. A vehicle wheel as in claim 7 wherein said rim structure includes a cylindrical support and wherein rim means are assembled coaxially on said support.

9. A vehicle wheel as in claim 2 wherein said annular separating member is mounted on said rim structure.

10. A vehicle wheel as in claim 2 or 9 wherein said annular separating member is planar and is made of stiff, flexible material of a hardness greater than that of the tire side walls.

11. A vehicle wheel as in claim 2 wherein said annular separating member is incorporated in a side wall of a tire.

* * * * *